United States Patent [19]

Shirahata

[11] Patent Number: 4,472,562

[45] Date of Patent: Sep. 18, 1984

[54] STORAGE STABLE POLYORGANOSILOXANE COMPOSITIONS

[75] Inventor: Akihiko Shirahata, Ichihara, Japan

[73] Assignee: Toray Silicone Company, Ltd., Tokyo, Japan

[21] Appl. No.: 568,984

[22] Filed: Jan. 9, 1984

[30] Foreign Application Priority Data

Jan. 19, 1983 [JP] Japan .................................... 58-7688

[51] Int. Cl.³ ............................................. C08G 77/06
[52] U.S. Cl. ....................................... 528/15; 528/31; 528/32; 525/478
[58] Field of Search ........................... 528/15, 31, 32; 525/478

[56] References Cited

U.S. PATENT DOCUMENTS 3,383,356  5/1968  Nielsen ................................ 528/15
3,445,420  5/1969  Kookootsedes et al. ............ 528/25

*Primary Examiner*—Melvyn I. Marquis
*Attorney, Agent, or Firm*—Robert Spector

[57] ABSTRACT

The storage stability at ambient temperature of heat curable polyorganosiloxane compositions comprising a vinyl containing polyorganosiloxane, a polyorganosiloxane containing silicon-bonded hydrogen atoms and a platinum, palladium, or rhodium catalyst is improved using specified monohydrocarbyltrialkynyloxysilanes as storage stabilizers. The stabilizers do not interfere with curing of the compositions at elevated temperatures.

23 Claims, No Drawings

STORAGE STABLE POLYORGANOSILOXANE COMPOSITIONS

BACKGROUND OF THE INVENTION

1. Field of the Invention

This invention relates to a polyorganosiloxane composition containing a storage stabilizer with a specific structure. More particularly, this invention relates to a polyorganosiloxane composition which exhibits excellent long-term storage stability at room temperature and is rapidly cured by heating through addition type reactions.

2. Description of the Prior Art

The prior art teaches polyorganosiloxane compositions comprising a vinyl group-containing polyorganosiloxane, a polyorganohydrogensiloxane and a platinum catalyst as principal components. These compositions, in combination with a storage stabilizer, are cured by heating, which accelerates the addition type curing reaction. Specific examples of such prior art include U.S. Pat. Nos. 3,383,356, 3,445,420 and 3,461,185 and Japanese patent publications Nos. 51-28119 [76-28119], 53-35983 [78-35983]and 54-3774[79-3774]. These prior art compositions can be stored for long periods of time, even after all the components have been mixed, and can be cured only by heating.

Storage stabilizers disclosed in the prior art include organic and organosilicon compounds containing at least one carbon-carbon double bond or carbon-carbon triple bond per molecule. Typical examples of such prior art are U.S. Pat. No. 3,383,356, which discloses ethylene tetrachloride and U.S. Pat. No. 3,445,420, which discloses acetylenic alcohols, such as 3-methyl-1-butyne-3-ol, in addition to silanes and siloxanes containing at least one —C≡C— radical per molecule. Specific organosilicon stabilizers disclosed in this patent include phenyl tris (2-propynyloxy)silane, phenylmethyl bis(1-methyl-2-propynyloxy) silane and sym tetramethyldiethynyldisiloxane.

The activity of all the aforementioned prior art stabilizers is less than satisfactory. Even when these stabilizers are used, the viscosity of the addition-curable polyorganosiloxane composition gradually increases during storage. The use of a large quantity of storage stabilizer in order to completely suppress this increase in viscosity will result in inadequate compatibility and separation of the stabilizer, a requirement for relatively high curing temperatures, or consumption of a large portion of the Si-H groups in the organohydrogenpolysiloxane by reaction with the storage stabilizer, with resultant unsatisfactory curing.

In view of the foregoing drawbacks of prior art compositions, these compositions are usually made commercially available in the form of two liquids to which a small amount of storage stabilizer is added in order to obtain some working time after combining the liquids. The storage stabilizer used in these compositions must suppress the increase in viscosity for a certain period of time after mixing and must be inactivated in the curing process so the composition will cure rapidly. However, this type of storage stabilizer, represented by 3-methyl-1-butynl-3-ol, has a high vapor pressure and is removed in the reduced-pressure defoaming step which is typically employed after the two liquids have been mixed with each other. The effects of the stabilizer are therefore not exhibited and the composition does not have a useful pot life. On the other hand, when an acetylene-type compound containing a larger number of carbons is employed in order to reduce the vapor pressure, the miscibility with the siloxane is poor and curing will be uneven.

SUMMARY OF THE INVENTION

Polyorganosiloxane compositions which do not exhibit the aforementioned drawbacks of stabilized prior art compositions are characterized by the presence of specified classes of polyorganosiloxanes and a storage stabilizer which is a silane containing 3 alkynyloxy groups of specified structure bonded to silicon.

DETAILED DESCRIPTION OF THE INVENTION

This invention provides a polyorganosiloxane composition consisting essentially of (a) a polyorganosiloxane comprising units of the general formula

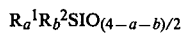

where $R_1$ represents an alkenyl radical containing from 2 to 4 carbon atoms or a methacrylyl radical, $R^2$ represents a monovalent hydrocarbon radical which is substantially free of ethylene unsaturation and contains from 1 to 20 carbon atoms, a is an integer from 1 to 3 inclusive, b is an integer from 0 to 2, inclusive, and the sum of a and b is 3 or less, with the proviso that said polyorganosiloxane does not contain any halogenated hydrocarbon radicals; (b) a polyorganohydrogensiloxane comprising units of the general formula

where $R^3$ represents a hydrocarbon radical selected from the same group as $R^2$, c is an integer from 1 to 3, inclusive, d is an integer from 0 to 2, inclusive, and the sum of c and d is 3 or less, with the proviso that said polyorganohydrogensiloxane does not contain any halogenated hydrocarbon radicals; and the amount of said polyorganohydrogensiloxane is sufficient to provide at least 0.2 equivalent of silicon-bonded hydrogen atoms per equivalent of alkenyl radicals present in said polyorganosiloxane; (c) an amount of a platinum, palladium, or rhodium catalyst sufficient to provide from 0.1 to 1000 ppm of metal, based on the combined weight of components (a) and (b); and (d) a silane of the general formula

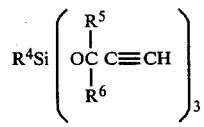

where $R^4$, $R^5$ and $R^6$ are identical or different monovalent hydrocarbon radicals containing from 1 to 10 carbon atoms, or $R^5$ and $R^6$ jointly form a divalent hydrocarbon radical. The amount of said silane is sufficient to retard curing of said curable polyorganosiloxane composition at room temperature.

This invention will now be explained in detail. The polyorganosiloxane, component (a) of the present compositions, contains repeating units of the general formula $$R_a^1R_b^2SiO_{(4-a-b)/2},\quad (1)$$

$R^1$, $R^2$, a and b having been defined hereinabove, and does not contain halogenated hydrocarbon radicals.

In addition to units of formula (1), component (a) may contain other organosiloxane units, so long as these units do not contain halogenated hydrocarbon radicals. The molecular configuration of component (a) can be straight chain, branched chain, cyclic or crosslinked network. The degree of polymerization of component (a) is at least 2, and the upper limit is the maximum degree of polymerization obtainable, which is usually about 10,000. Preferably, the upper limit is about 2,000. Most preferably, the degree of polymerization varies from about 100 to 300.

Examples of the alkenyl radical represented by $R^1$ include vinyl, propenyl, butenyl and methacrylyl. The $R^2$ radicals present in a molecule of component (a) may be identical or different. Examples of $R^2$ include methyl, ethyl, propyl, butyl, octyl, phenyl, phenylethyl and phenylpropyl. The number of carbon atoms in $R^2$ is typically from 1 to 20. The value of the integer represented by a and b in formula (1) are a is from 1 to 3, inclusive, b is from 0 to 2, inclusive, and the sum of a and b is 3 or less. Preferably a is 1, b is 0, 1, or 2. When component (a) contains additional siloxane units which are not represented by general formula (1), the structure of these units is arbitrary as long as they do not contain halogenated hydrocarbon radicals.

Preferably component (a) contains additional siloxane units represented by formula (2).

$$R_e^2SiO_{(4-e/2)} \quad (2)$$

where $R^2$ has been defined hereinabove and e is an integer from 1 to 3, inclusive.

Specific examples of units represented by formula (2) include diorganosiloxane units such as dimethylsiloxane, methylphenylsiloxane, diphenylsiloxane, and methyloctylsiloxane; triorganosiloxane units such as trimethylsiloxy and dimethylphenylsiloxy, and monoorganosiloxy units such as methylsiloxy, propylsiloxy, and phenylsiloxy.

Specific examples of component (a) include, but are not limited to, dimethylvinylsiloxy-terminated polydimethylsiloxanes, phenylmethylvinylsiloxy-terminated diphenylsiloxane/dimethylsiloxane copolymers, trimethylsiloxy-terminated diphenylsiloxane/dimethylsiloxane copolymers, and trimethylsiloxy-terminated methylvinylsiloxane/dimethylsiloxane copolymers.

The polyorganohydrogensiloxane comprising component (b) of the present compositions contains organohydrogensiloxane units with the general formula $$H_cR_d^3SiO_{(4-c-d)/2}. \quad (3)$$

$R^3$, c and d have been defined hereinbefore, and component (b) contains no halogenated hydrocarbon radicals. Component (b) may consist essentially entirely of organosiloxane units with general formula (3) or it may contain other organosiloxane units. The additional units are preferably represented by formula (4)

$$R_f^3SiO_{(4-f)/2} \quad (4)$$

where f represents an integer from 1 to 3, inclusive.

The molecular configuration of the polyorganohydrogensiloxane can be straight chain, branched chain, cyclic, or crosslinked network. The degree of polymerization is at least 2, and the upper limit is the maximum degree obtainable, which is usually about 10,000. Preferably the maximum is about 2,000, most preferably about 100. The $R^3$ radicals present in a molecule of component (b) may be identical or different. Specific examples of radicals represented by $R^3$ are disclosed hereinbefore for $R^2$, and include propyl, butyl, octyl, phenyl, phenylethyl and phenylpropyl. The number of carbon atoms in $R^3$ is typically from 1 to 20, c is an integer from 1 to 3, inclusive, d is an integer from 0 to 2, inclusive, and the sum of c and d is 3 or less. Preferably c is 1, d is 0, 1, or 2 and f is 2.

Specific examples of component (b) include, but are not limited to dimethylhydrogensiloxy-terminated dimethylsiloxane/methylhydrogensiloxane copolymers, trimethylsiloxy-terminated dimethylsiloxane/methylhydrogensiloxane copolymers and cyclic polymethylhydrogensiloxanes.

When heated above room temperature, components (a) and (b) of the present compositions will react in the presence of a catalyst, discussed below in detail, to form a product of higher molecular weight than (a) or (b).

To obtain a cured product in the form of a rubbery or resinous material, component (a) must contain an average of at least 2 alkenyl groups per molecule and component (b) must contain an average of at least 2 silicon-bonded hydrogen atoms per molecule. The total of the foregoing averages of alkenyl groups and silicon-bonded hydrogen atoms preferably exceeds 4.0.

To form a satisfactorily cured noncellular product, the quantity of component (b) that is mixed with component (a) must be sufficient to provide from 0.2 to 5 equivalents of silicon-bonded hydrogen atoms per equivalent of alkenyl radicals in component (a). Below 0.2 equivalents of hydrogen per equivalent of alkenyl radical, curing is inadequate. On the other hand, above 5 equivalents of silicon-bonded hydrogen, hydrogen gas bubbles are evolved, which adversely affects the stability of the composition. The quantity of silicon-bonded hydrogen can exceed 5 equivalents when production of a foam is desired.

To avoid inadequate or nonuniform curing, components (a) and (b) must be adequately miscible at the required concentrations. For this reason, $R^2$ should be identical to $R^3$ or, alternatively, substantial portions of $R^2$ and $R^3$ should be identical.

The catalyst comprising component (c) of the present compositions is selected from known hydrosilation catalysts. Examples of component (c) include platinum catalysts such as extremely fine platinum powder, extremely fine platinum powder adsorbed on a carbon powder support, chloroplatinic acid, alcohol-modified chloroplatinic acid, olefin complexes of chloroplatinic acid, chloroplatinic acid-vinylsiloxane coordination compounds, and platinum black; palladium catalysts such as tetrakis(triphenylphosphine)palladium and palladium black, and any of the known rhodium hydrosilation catalysts.

The quantity of component (c) should be adequate to cure a composition comprising the above components (a) and (b). Typically the amount of (c) is from 0.1 to 1,000 ppm of metal based on the combined weight of (a) and (b). A homogeneous catalyst is typically used at a concentration equivalent to from 0.1 to 100 ppm of metal content based on the quantity of components (a) and (b) while a hetrogeneous catalyst, such as platinum black, is used at from 20 ppm to 1,000 ppm of metal content.

The storage stabilizer, component (d) of the present compositions, functions as a cure inhibitor and is a silane of the general formula

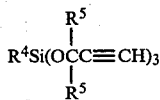

where $R^4$, $R^5$ and $R^6$ are as previously defined. The hydrocarbon radicals represented by $R^4$, $R^5$, and $R^6$ may or may not be identical, however, $R^4$, $R^5$, and $R^6$ are preferably identical to the monovalent hydrocarbon radicals present in the organosiloxane units of component (a) and (b) in order for component (d) to function adequately. For example, when $R^2$ and $R^3$ are alkyl, $R^4$, $R^5$, and $R^6$ should also be alkyl. When $R^2$ and $R^3$ are alkyl and phenyl, $R^4$, $R^5$, and $R^6$ should also be alkyl and phenyl. Typically, the alkyl radicals are methyl, ethyl, and propyl and the aryl radicals are phenyl. Typical examples of component (d) include, but are not limited to

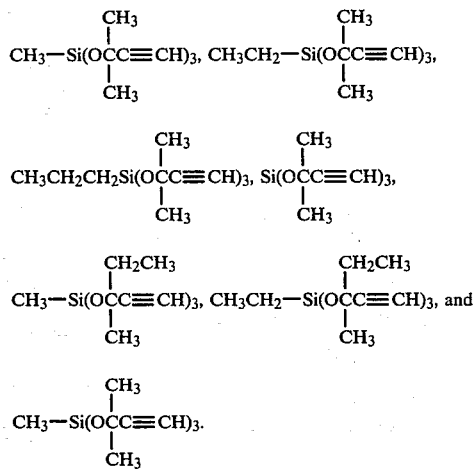

Aternatively, the radicals represented by $R^5$ and $R^6$ in the foregoing formula may jointly form a divalent hydrocarbon radical. Examples of such silanes include:

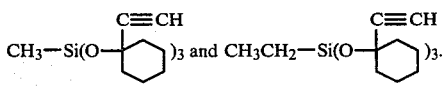

The characterizing feature of component (3) is the presence on the silicon atom of three residues formed by removal of the hydroxyl hydrogen from a 3-ethynyl tertiary carbinol of the formula

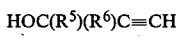

This specific structure exhibits an excellent effect as a storage stabilizer in the present compositions. This component exhibits unexpectedly higher activity as a storage stabilizer compared with the storage stabilizers described in Japanese patent publication No. 53-35983 [78-35983], which are silanes such as

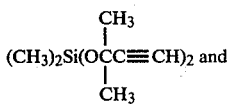

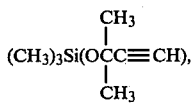

in which 1 or 2 residues of the aforementioned carbinols are bonded to silicon through oxygen atoms. In particular, both the long term reaction inhibiting capacity per acetylene bond and the capacity for inhibiting an increase in viscosity during the initial stage of mixing of all components are increased.

Component (d) of the present compositions is superior to alkynyl alcohols such as 3-methyl-1-butyn-3-ol or 3,5-dimethyl-1-hexyn-3-ol, which are prior art storage stabilizers. For example, the quantity of component (d) can be varied as required to completely suppress the increase in viscosity for an arbitrary period of time, yet this component is rapidly inactivated by heating, causing only a minimal delay in initiation of curing. Furthermore, this component exhibits a low vapor pressure and is therefore not removed in the conventional reduced-pressure defoaming process, and exhibits the effect of a storage stabilizer for the required period of time. Preferred embodiments of component (c) also exhibit excellent miscibility with components (a) and (b), and therefore do not cause uneven curing.

The quantity of component (d) relative to components (a) and (b) will be determined by the required storage time following mixing of all components of the present composition. Typically from 2 to 10,000 moles of component (d) are present per 1 mole of catalyst. Preferably from 10 to 150 moles of component (d) are used per mole of catalyst.

Fillers and other additives may be added to the present composition in order to reduce thermal shrinkage during curing, reduce the thermal expansion coefficient of the compositions or gas permeability, or increase thermal stability, weather resistance, chemical resistance, flammability or the mechanical strength of the cured elastomer. Typical additives include fumed silica, quartz powder, glass fibers, carbon black, alumina, metal oxides such as iron oxide and titanium oxide, and metal carbonates such as calcium carbonate, and magnesium carbonate. In addition, pigments, dyes, blowing agents, and antioxidants may be added, so long as they do not adversely affect curing of the composition. Furthermore, the composition may be diluted with an appropriate solvent such as xylene or toluene, depending on its end use or purpose.

The present compositions can be stored at room temperature for a long period of time after all the components have been mixed without an increase in viscosity and can be rapidly cured by moderate heating to produce a resin, rubber, gel, or foam. The temperature dependence of curing is much greater for the present compositions than for prior art polyorganosiloxane compositions.

The present compositions are suitable for all the applications of typical curable polyorganosiloxane compositions. Examples of such applications include potting compounds for the electric-electronic industry; potting compounds, coating materials and molded products for general industrial use; rubber for forming molds, sealing agents for penetrating parts and joints in civil engineering structures or buildings; materials for medical moldings and dental impressions; and liquid injection molding compositions.

This invention will be further explained using demonstrational examples. "Parts" in the examples denotes "parts by weight," viscosity values are in pascal seconds (Pa·s), measured at 25° C. Me represents the methyl group, and Vi represents the vinyl group.

EXAMPLE 1

A mixture containing 100 parts of a dimethylvinylsiloxy-terminated polydimethylsiloxane exhibiting a viscosity of 0.5 Pa·s and containing 0.5 wt. % of vinyl radicals and 4 parts of a dimethylsiloxane/methylhydrogensiloxane copolymer hereinafter referred to as siloxane copolymer A of the average molecular formula

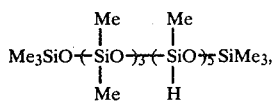

was combined with 0.01 part of a storage stabilizer of the formula

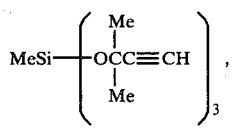

and blended to homogeneity. The resulting mixture was combined and blended to homogeneity with an amount of a vinylsiloxane complex of chloroplatinic acid equivalent to 5 ppm platinum, based on the total weight of the mixture. The mixture was then defoamed for 10 minutes under a pressure of 10 mm Hg. The initial viscosity of the defoamed composition was 0.32 Pa·s. After standing for 10 hours at 25° C., the viscosity of the composition was 0.35 Pa·s. The viscosity began to increase significantly after 12 hours and the composition was completely cured to a rubbery material after 12.5 hours. The defoamed composition cured to a rubbery material in 30 seconds at a temperature of 150° C.

EXAMPLE 2

The types and amounts of vinyl substituted polydimethylsiloxane and organosiloxane copolymer described in Example 1 were combined and blended to homogeneity with 0.15 part of the storage stabilizer of Example 1.

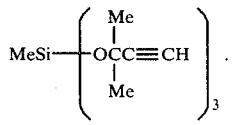

The resulting mixture was blended to homogeneity with the same platinum complex as in Example 1 equivalent to 5 ppm of platinum, based on total composition weight, and defoamed for 10 minutes under a pressure of 10 mm Hg. After standing for twenty-two hours at 25° C., the final composition exhibited a viscosity of 0.37 Pa·s After 23 hours, the viscosity had increased significantly, and the composition completely cured to a rubbery material after 23.5 hours. This same composition cured to a rubbery material in 40 seconds at a temperature of 150° C.

EXAMPLE 3

The types and amounts of vinyl substituted polyorganosiloxane and organosiloxane copolymer described in Example 1 were combined and mixed to homogeneity with 0.05 part of

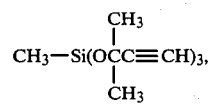

The resulting mixture was combined and mixed to homogeneity with the same type and relative amount of platinum complex described in Example 1, following which it was defoamed for 10 minutes under a pressure of 10 mm Hg. The defoamed composition was allowed to stand at 25° C. for 4 weeks, during which it did not exhibit any significant viscosity increase. By comparison, the defoamed composition cured to a rubbery material in 90 seconds at 150° C.

COMPARISON EXAMPLE 1

As a comparative example, the same types and amounts of vinyl substituted polydimethylsiloxane and siloxane copolymer A described in Example 1 were combined and mixed to homogeneity with 0.01 part of 3-methyl-1-butyn-3-ol. The resulting mixture was then combined and mixed to homogeneity with the same type and relative amount of platinum complex described in Example 1. The resulting mixture was defoamed for 10 minutes under a pressure of 10 mm Hg. The defoamed composition cured in one hour at 25° C.

COMPARISON EXAMPLE 2

The types and amounts of vinyl substituted polydimethylsiloxane and siloxane copolymer A described in Example 1 were combined and mixed to homogeneity with 0.015 part of

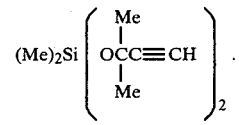

The resulting mixture was then combined and mixed to homogeneity with the same type and relative amount of platinum complex described in Example 1, defoamed for 10 minutes under a pressure of 10 mm Hg, and then allowed to stand at 25° C. After 3 hours, the viscosity of the composition was in excess of 0.5 Pa·s and thereafter gradually increased to the extent that it had cured into a rubbery material in 8 hours.

COMPARISON EXAMPLE 3

A defoamed composition identical to that of Example 1, with the exception that it did not contain any storage stabilizer, cured to a rubbery material during a 7 to 8 minute exposure period at 25° C.

EXAMPLE 4

A homogeneous mixture of 100 parts of a dimethylvinylsiloxy-terminated polydimethylsiloxane containing 0.2% by weight of vinyl radical and 1 part of a trimethylsiloxy-terminated polymethylhydrogensiloxane was combined and blended to homogeneity with 0.01 part of the storage stabilizer of Example 1.

The viscosities of the polydimethylsiloxane and polymethylhydrogensiloxane were 2 and 0.01 Pa·s, respectively. The resulting mixture was combined and mixed to homogeneity with an amount of a vinylsiloxane complex of chloroplatinic acid containing 5 ppm platinum relative to the total mixture. The resulting mixture was defoamed for 10 minutes under a pressure of 10 mm Hg. and then allowed to stand at 25° C. The initial viscosity of the defoamed composition was 1.9 Pa·s and was 2.05 Pa·s 9 hours later. The defoamed composition underwent a significant increase in viscosity following the initial 11 hour exposure and cured to a rubbery material after an additional 0.5 hour. By comparison, when this composition was heated at 150° C., it cured to a rubbery material in 30 seconds.

COMPARISON EXAMPLE 4

The procedure described in Example 4 were repeated, with the exception that the storage stabilizer was 3-methyl-1-butyn-3-ol. The defoamed composition cured to a rubbery material in 1 hour at 25° C.

COMPARISON EXAMPLE 5

The procedure described in Example 4 was repeated, with the exception that the storage stabilizer used was

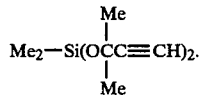

The defoamed composition had a viscosity of 2.5 Pa·s after 2 hours at 25° and a viscosity of 3.8 Pa·s after 3 hours. The composition continued to gradually increase in viscosity with time and cured into a rubbery material in 8 hours.

EXAMPLE 5

A homogeneous mixture containing 100 parts of a dimethylvinylsiloxy-terminated dimethylsiloxane/phenylmethylsiloxane copolymer containing 10 mole % phenylmethylsiloxane units and exhibiting a viscosity of 2 Pa·s, and 5 parts of a siloxane copolymer A of the average molecular formula

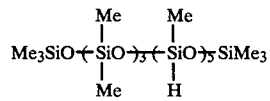

was combined and blended to homogeneity with 0.01 part of

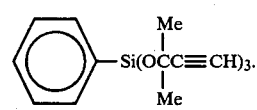

The resulting mixture was combined and blended to homogeneity with an amount of a vinylsiloxane complex of chloroplatinic acid equivalent to 5 ppm platinum based on the entire composition, and was then defoamed for 10 minutes under a pressure of 10 mm Hg. The viscosity of the resultant composition increased from 1.8 to 2.0 Pa·s during 15 hours at 25° C., after which it underwent a significant increase in viscosity, with the result that it was completely cured into a rubbery material after 17 hours. The defoamed composition cured into a rubbery material in about 40 seconds at 150° C.

EXAMPLE 6

A mixture containing the types and amounts of vinyl substituted polydimethylsiloxane and siloxane copolymer A described in Example 5 was combined and blended to homogeneity with 0.03 part of the stabilizer of Example 5.

The resulting mixture was combined and mixed to homogeneity with the same type and amount of platinum complex described in Example 5 and then defoamed for 10 minutes under a pressure of 10 mm Hg. The defoamed composition exhibited little increase in viscosity during one week at 25° C. The defoamed composition cured into a rubbery material in 90 seconds at 150° C.

COMPARISON EXAMPLE 6

The procedure described in Example 5 was repeated, with the exception that the storage stabilizer was

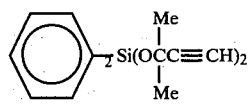

The defoamed composition cured into a rubbery material in 1 hour at 25° C.

EXAMPLE 7

A 35 part portion of a toluene-soluble polyorganosiloxane resin containing 20 mol % of Me₂ViSiO½units, 20 mol % Me₃SiO½units, and 60 mol % of SiO₄/₂ units was dissolved in 100 parts of toluene and then combined with 65 parts of a dimethylvinylsiloxy-terminated polydimethylsiloxane exhibiting a viscosity of 2 Pa·s at 25° C. The toluene was subsequently removed and the resulting mixture was combined with 6 parts of the siloxane copolymer A disclosed in Example 1. The resulting mixture was then combined and mixed to homogeneity with 0.01 part of

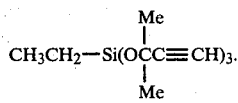

The resulting mixture was then combined and mixed to homogeneity with an amount of a vinylsiloxane complex of chloroplatinic acid equivalent to 5 ppm platinum, based on the entire mixture, and subsequently defoamed for 10 minutes under a pressure of 10 mm Hg. When allowed to stand at 25° C., the viscosity of the defoamed composition increased from 3.4 to 3.6 Pa·s during an 8 hour period, following which it underwent a significant increase in viscosity to yield a completely cured resin in 9.5 hours. By comparison, the composition cured to a resin in 30 seconds at 120° C.

COMPARISON EXAMPLE 7

The procedure described in Example 7 was repeated with the exception that 3-methyl-1-butyn-3-ol replaced $$CH_3CH_2-\underset{\underset{Me}{|}}{\overset{\overset{Me}{|}}{Si}}(OCC\equiv CH)_3.$$

The defoamed composition cured to a resin in 1 hour at 25° C.

COMPARISON EXAMPLE 8

The procedure described in Example 7 was repeated with the exception that the storage stabilizer was $$(CH_3CH_2)_3-Si O\underset{\underset{Me}{|}}{\overset{\overset{Me}{|}}{C}}C\equiv CH$$

The defoamed composition was allowed to stand at 25° C., and had a viscosity of 4.5 Pa·s after 2 hours and a viscosity of 6.0 Pa·s after 3 hours. The composition then underwent a gradual increase in viscosity to the extent that it cured into a solid resin in 6 hours.

That which is claimed is:

1. A polyorganosiloxane composition consisting essentially of
    (a) a polyorganosiloxane comprising organosiloxane units (1) of the formula $R_a^1R_b^2SiO_{(4-a-b)/2}$, wherein $R^1$ represents an alkenyl radical containing from 2 to 4 carbon atoms or a methacrylyl radical, $R^2$ represents a monovalent hydrocarbon radical which is substantially free of ethylenic unsaturation and contains from 1 to 20 carbon atoms, a is an integer from 1 to 3, inclusive, b is an integer from 0 to 2, inclusive, and the sum of a and b is 3 or less, with the proviso that said polyorganosiloxane does not contain any halogenated hydrocarbon radicals;
    (b) a polyorganohydrogensiloxane comprising organosiloxane units (2) of the formula $H_cR_d^3SiO_{4-c-d/2}$, where $R^3$ represents a hydrocarbon radical selected from the same group as $R^2$, c is an integer from 1 to 3, inclusive, d represents an integer of from 0 to 2, inclusive, and the sum of c and d is 3 or less, with the proviso that said polyorganohydrogensiloxane does not contain any halogenated hydrocarbon radicals, and the amount of said polyorganohydrogensiloxane is sufficient to provide at least 0.2 equivalent of silicon-bonded hydrogen atoms per equivalent of alkenyl radicals present in said polyorganosiloxane;
    (c) an amount of a platinum, palladium, or rhodium catalyst sufficient to provide from 0.1 to 1000 ppm of metal, based on the combined weight of components (a) and (b); and
    (d) a silane of the general formula $$R^4Si\left(O\underset{\underset{R^6}{|}}{\overset{\overset{R^5}{|}}{C}}C\equiv CH\right)_3$$

where $R^4$, $R^5$ and $R^6$ are identical or different monovalent hydrocarbon radicals containing from 1 to 10 carbon atoms, or $R^5$ and $R^6$ jointly form a divalent hydrocarbon radical, the amount of said silane being sufficient to retard curing of said curable polyorganosiloxane composition at room temperature.

2. A composition according to claim 1 where said polyorganosiloxane further comprises repeating units of the formula $$R_e^2SiO_{(4-e)/2},$$

where e is an integer from 1 to 3, inclusive, and said polyorganohydrogensiloxane further comprises repeating units of the formula $$R_f^3SiO_{(4-b)/2},$$

where f is an integer from 1 to 3, inclusive.

3. A composition according to claim 1 where $R^4$, $R^5$ and $R^6$ are selected from alkyl, aryl and aralkyl.

4. A composition according to claim 3 where $R^4$, $R^5$ and $R^6$ are methyl.

5. A composition according to claim 3 where $R^4$, $R^5$ and $R^6$ are ethyl or phenyl.

6. A composition according to claim 1 where $R^5$ and $R^6$ jointly represent n-pentylene.

7. A composition according to claim 1 where the silane is represented by a formula selected from the group consisting of $$CH_3-\underset{\underset{CH_3}{|}}{\overset{\overset{CH_3}{|}}{Si}}(OCC\equiv CH)_3, \quad CH_3CH_2-\underset{\underset{CH_3}{|}}{\overset{\overset{CH_3}{|}}{Si}}(OCC\equiv CH)_3,$$

$$CH_3CH_2CH_2Si(O\underset{\underset{CH_3}{|}}{\overset{\overset{CH_3}{|}}{C}}C\equiv CH)_3, \quad Si(O\underset{\underset{CH_3}{|}}{\overset{\overset{CH_3}{|}}{C}}C\equiv CH)_3,$$

$$CH_3-\underset{\underset{CH_3}{|}}{\overset{\overset{CH_2CH_3}{|}}{Si}}(OCC\equiv CH)_3, \quad CH_3CH_2-\underset{\underset{CH_3}{|}}{\overset{\overset{CH_2CH_3}{|}}{Si}}(OCC\equiv CH)_3,$$

$$CH_3-\underset{\underset{CH_3}{|}}{\overset{\overset{CH_3}{|}}{Si}}(OCC\equiv CH)_3,$$

$$CH_3-Si(O-\underset{}{\bigcirc}-\overset{C\equiv CH}{})_3, \text{ and } CH_3CH_2-Si(O-\underset{}{\bigcirc}-\overset{C\equiv CH}{})_3$$

8. A composition according to claim 1 where the molar concentration of silane is from 2 to 10,000 times the molar concentration of component (c).

9. A composition according to claim 1 where the hydrocarbon radicals represented by $R^4$, $R^5$, and $R^6$ are identical to the radicals represented by $R^2$ and $R^3$.

10. A composition according to claim 2 where $R^1$ represents a vinyl, propenyl, butenyl, or methacrylyl radical and $R^2$ represents a methyl, ethyl, propyl, butyl, octyl, phenyl, phenylethyl or phenylpropyl radical, a is 1, and b is 0, 1 or 2, and e is 2.

11. A composition according to claim 2 where said polyorganosiloxane is selected from the group consisting of dimethylvinylsiloxy-terminated polydimethylsiloxanes, phenylmethylvinylsiloxy-terminated diphenylsiloxane/dimethylsiloxane copolymers and trimethylsiloxy-terminated methylvinylsiloxane/dimethylsiloxane copolymers.

12. A composition according to claim 2 where the degree of polymerization of said polyorganosiloxane is from 2 to 2,000.

13. A composition according to claim 12 where the degree of polymerization is from 100 to 300.

14. A composition according to claim 2 where $R^3$ is alkyl, aryl, or aralkyl, c is 1, d is 0, 1 or 2 and f is 2.

15. A composition according to claim 14 where $R^3$ is methyl.

16. A composition according to claim 15 where the polyorganohydrogensiloxane is a dimethylsiloxane/methylhydrogensiloxane copolymer.

17. A composition according to claim 2 where the concentration of polyorganohydrogensiloxane is equivalent to from 0.2 to 5 equivalents of silicon-bonded hydrogen atoms per equivalent of alkenyl radicals present in said polyorganosiloxane.

18. A composition according to claim 1 wherein said catalyst is platinum or a platinum compound.

19. A composition according to claim 18 where the catalyst is homogeneous with respect to said composition and is present in an amount equivalent to from 0.1 to 100 ppm of platinum based on the combined weight of components (a) and (b).

20. A composition according to claim 18 where the catalyst is heterogeneous with respect to said composition and is present in an amount equivalent to from 20 to 1,000 ppm of platinum based on the combined weight of components (a) and (b).

21. A composition according to claim 18 where the catalyst is a vinylsiloxane complex of chloroplatinic acid.

22. A composition according to claim 21 where from 10 to 150 moles of said silane are present per mole of said vinylsiloxane complex.

23. A composition according to claim 2 where said polyorganosiloxane is a dimethylvinylsiloxy-terminated polydimethylsiloxane or a dimethylvinylsiloxy-terminated dimethylsiloxane/phenylmethylsiloxane copolymer, said polyorganohydrogensiloxane is a trimethylsiloxy-terminated dimethylsiloxane/methylhydrogensiloxane copolymer or a trimethylsiloxy-terminated polymethylhydrogensiloxane, the catalyst is a vinylsiloxane complex of chloroplatinic acid and the silane is $R^4Si(OC(CH_3)_2C\equiv CH)_3$ where $R^4$ is methyl, ethyl, or phenyl.

* * * * *

UNITED STATES PATENT AND TRADEMARK OFFICE
CERTIFICATE OF CORRECTION

PATENT NO. : 4,472,562

DATED : September 18, 1984

INVENTOR(S) : Akihiko Shirahata

It is certified that error appears in the above-identified patent and that said Letters Patent is hereby corrected as shown below:

In column 2, line 21, "SIO" should read -- SiO --.

Signed and Sealed this

Ninth Day of April 1985

[SEAL]

Attest:

DONALD J. QUIGG

Attesting Officer     Acting Commissioner of Patents and Trademarks